United States Patent Office.

FELIX BAUER, OF BERLIN, AND ALBERT BUSCH, OF ELBERFELD, GERMANY, ASSIGNORS TO BAUER & CIE., OF BERLIN, GERMANY.

ALBUMEN PREPARATION SOLUBLE IN WATER.

SPECIFICATION forming part of Letters Patent No. 601,995, dated April 5, 1898.

Application filed March 1, 1898. Serial No. 672,183. (No specimens.)

*To all whom it may concern:*

Be it known that we, FELIX BAUER, doctor of philosophy, chemist, a subject of the King of Saxony, residing in Berlin, and ALBERT BUSCH, doctor of philosophy, chemist, a subject of the Duke of Brunswick, residing in Elberfeld, in the Kingdom of Prussia, German Empire, have invented a certain new and useful Process for Manufacturing Albumen Preparations Soluble in Water, of which the following is a specification.

According to the works of Robin and other authors the glycerophosphates increase the availability of the albumen in the process of digestion. They favor, moreover, the metabolism of sulfur and the assimilation of nutritive phosphates. In consequence of these properties it should appear advisable to manufacture preparations which in addition to the glycerophosphates contain at the same time albuminoids in an easily-assimilable form. We have found that glycerophosphates are capable of rendering soluble in a considerable quantity albuminoids which are insoluble in water and of rendering them thereby easily assimilable. If solutions prepared in this way are evaporated in vacuo at a low temperature, particularly efficacious and also durable nutritive preparations are obtained, which are readily soluble in cold water and dissolve by heat into a milky liquor.

The process of manufacturing the preparations in question can be carried out in several ways. Particularly good practical results ensue from the process hereinafter described.

The albuminoids (albuminates, casein of milk, and vegetable casein, which are used for this purpose) are mixed with water containing alcohol or other liquids which do not act chemically on the material, and the quantity of glycerophosphate of soda necessary for rendering them soluble is added in small portions with constant stirring. A twenty-per-cent. solution of glycerophosphate of soda is found suitable for this proportion, although it is evident that solutions of a different strength may be used. For example, the casein of milk is a material suitable for preparing the soluble foods in question. A convenient proportion in which the ingredients are used is shown in the following example: A quantity of the fresh curd corresponding to one gram of the dry substance is suspended mechanically in a fine state of subdivision in about ten cubic centimeters of the alcoholic mixture mentioned above. The percentage strength of alcohol may be varied, but about ten per cent. will be found advantageous. To the suspended casein the solution of glycerophosphate above mentioned is added little by little with constant stirring. About an equal quantity of the solution—viz., ten cubic centimeters—will be found sufficient to secure the solution of the proteid substance. It is evident that other proteid matters—as, for instance, the gluten of wheat or the zein of Indian corn—may be used and the proportions of solvent, aqueous alcohol, and glycerophosphate may be varied, so as to produce the best results in each case. The mixture is then gently heated and the small quantities of water are removed. This may be advantageously done by washing with strong alcohol, after which the residual alcohol is removed by drying. In place of alcohol other liquids not acting on the substance—such as ether, &c.—may be used. After having let the mixture stand for some time the undissolved albumen is removed and the solution of albumen in the glycerophosphate of soda is evaporated in vacuo at a temperature of 40° centigrade. In lieu of evaporating, the albumen dissolved in the glycerophosphate of soda may be precipitated from the aqueous solution by means of alcohol. The behavior of the products and their properties, whichever albuminates or caseins are combined with the glycerophosphates, is the same.

We claim—

1. The process for manufacturing albumen preparations soluble in water from glycerophosphates and albuminoids (albuminates, casein of milk and vegetable casein), consisting in mixing the albuminoids suspended in an inactive liquid with the quantities of glycerophosphates necessary for solution, in heating the mixture, in eliminating the water, and in drying the product, substantially as set forth.

2. The within-described water-soluble albuminoid product containing glycerophosphate of soda, and obtained as set forth, in the form of a powder, white in color, without smell and taste, absorbing cold water readily and dissolving by heat into a milky liquor, substantially as described.

In witness whereof we have hereunto signed our names in the presence of two subscribing witnesses.

FELIX BAUER.
    ALBERT BUSCH.

Witnesses to Felix Bauer's signature:
 BERNARD MÜLLER,
 GUSTAV KÜLMANN.

Witnesses to Albert Busch's signature:
 R. E. JAHN,
 OTTO KÖNIG.